US 011524735B2

United States Patent
Ishikawa et al.

(10) Patent No.: US 11,524,735 B2
(45) Date of Patent: Dec. 13, 2022

(54) WORK VEHICLE

(71) Applicant: KUBOTA CORPORATION, Osaka (JP)

(72) Inventors: Junichi Ishikawa, Osaka (JP); Minoru Hiraoka, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 466 days.

(21) Appl. No.: 16/496,012

(22) PCT Filed: Mar. 28, 2018

(86) PCT No.: PCT/JP2018/012709
§ 371 (c)(1),
(2) Date: Sep. 20, 2019

(87) PCT Pub. No.: WO2018/181459
PCT Pub. Date: Oct. 4, 2018

(65) Prior Publication Data
US 2020/0017152 A1 Jan. 16, 2020

(30) Foreign Application Priority Data

Mar. 29, 2017 (JP) .............................. JP2017-066389
Mar. 29, 2017 (JP) .............................. JP2017-066390

(51) Int. Cl.
*B62D 61/12* (2006.01)
*B25J 5/00* (2006.01)
(Continued)

(52) U.S. Cl.
CPC .............. *B62D 61/12* (2013.01); *B25J 5/007* (2013.01); *B62D 7/15* (2013.01); *B62D 15/00* (2013.01); *B62D 57/02* (2013.01)

(58) Field of Classification Search
CPC .................................. B62D 61/12; B25J 5/007
(Continued)

(56) References Cited

U.S. PATENT DOCUMENTS 4,558,758 A * 12/1985 Littman ................. B62D 7/026
180/236

FOREIGN PATENT DOCUMENTS

| JP | 61-500604 | 4/1986 |
| JP | 09-142347 | 6/1997 |

(Continued)

OTHER PUBLICATIONS

Official Communication issued in International Application No. PCT/JP2018/012709, dated Jun. 19, 2018.

*Primary Examiner* — Tony H Winner
*Assistant Examiner* — Felicia L. Brittman
(74) *Attorney, Agent, or Firm* — Greenblum & Bernstein, P.L.C.

(57) ABSTRACT

A work vehicle includes a plurality of traveling devices for driving traveling, a plurality of articulated link mechanisms having at least two or more joints and supporting the plurality of traveling devices to a vehicle body, with allowing the plurality of traveling devices to be elevated/lowered independently of each other, a driving mechanism capable of changing respective postures of the plurality of articulated link mechanisms independently of each other, and a plurality of turning mechanisms configured to support the respective plurality of the articulated link mechanisms, with allowing the link mechanisms to be orientation-changeable about a vertical axis.

11 Claims, 9 Drawing Sheets

(51) Int. Cl.
*B62D 7/15* (2006.01)
*B62D 15/00* (2006.01)
*B62D 57/02* (2006.01)

(58) Field of Classification Search
USPC .......................................................... 180/8.1
See application file for complete search history.

(56) References Cited

FOREIGN PATENT DOCUMENTS

| JP | 2005-131756 | | 5/2005 |
| JP | 2005131756 A | * | 5/2005 |
| JP | 2007-290054 | | 11/2007 |
| JP | 2009-096335 | | 5/2009 |

* cited by examiner

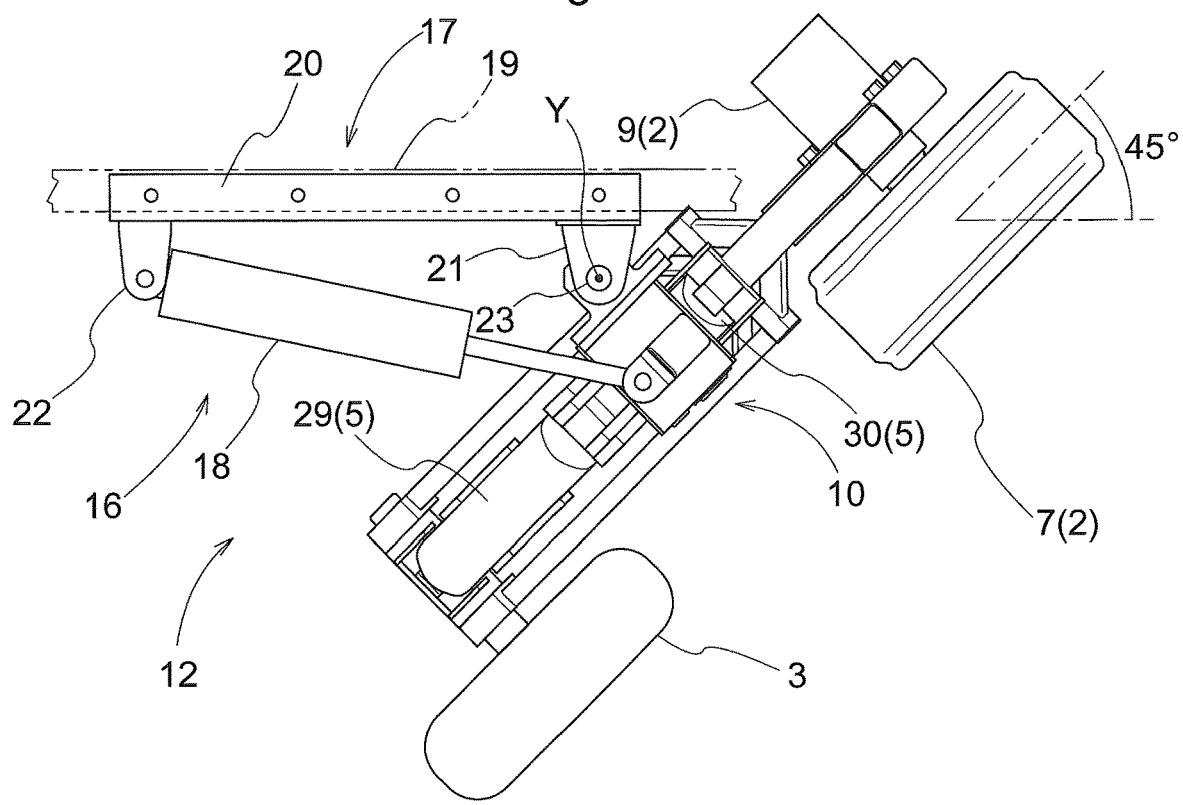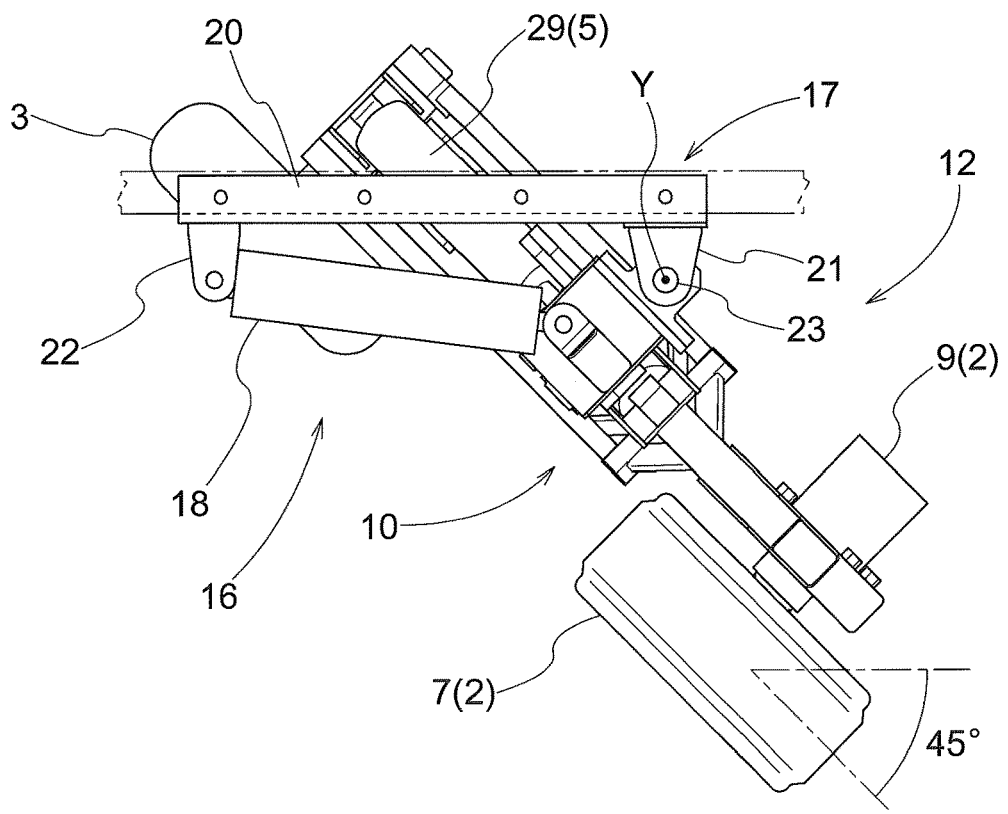

WORK VEHICLE

TECHNICAL FIELD

The present invention relates to a work vehicle suitable for traveling on a road surface having much unevenness.

BACKGROUND ART

[1] Among conventional work vehicles, there was a work vehicle configured such that a plurality of traveling devices mounted on a vehicle body respectively includes two joints and the traveling devices are supported to the vehicle body respectively via an articulated link mechanism having a plurality of links pivotally connected to each other to be pivotable about a horizontal axis (see e.g. JP H09-142347A (Patent Literature 1)).

[2] In JP H09-142347A, each one of the plurality of traveling devices is supported to the vehicle body to be independently height-adjustable via the link mechanism and a manipulator flexible in a desired direction is mounted on the vehicle body.

PRIOR ART DOCUMENT

Patent Literature

Patent Literature 1: Japanese Unexamined (Laid-Open) Patent Application H09-142347 (JP H09-142347A)

SUMMARY OF THE INVENTION

Problems to be Solved by Invention

[1] The problem corresponding to Background Art [1] is as follows.

With the above-described conventional arrangement, it is possible to travel to climb over a road surface having much unevenness by changing the heights of the plurality of traveling devices independently, with flexing the articulated link mechanism. However, since the plurality of links are configured to pivot about the horizontal axis, the orientation of the traveling devices remain fixed even when the heights thereof are changed.

As a result, at the time of straight traveling, this can be coped with by rotating the traveling devices about the horizontal axis; but when the vehicle is to make a turn to either the left or the right, it is necessary to cause the vehicle to make the turn by providing a speed difference between the left and right traveling devices. With this arrangement of making a turn by a speed difference between the left and the right, the traveling will proceed with skidding of the traveling devices. Thus, an excessive force may be applied sidewise to the traveling devices, and so there is a risk of durability reduction.

Further, in case the vehicle body has been elevated to a high position relative to the ground surface contacting the traveling devices by extending the articulated link mechanism, as the spacing between the traveling devices on the left and right opposed sides remains fixed, the left/right ground contacting width is decreased relative to the height of the vehicle body, so that there is a risk of the posture thereof becoming unstable.

In view of the above, it is desired to arrange such that a turn can be made smoothly without applying any excessive force to the traveling devices while allowing traveling to climb over significantly uneven road surface and stable support can be provided even when the vehicle body is elevated.

[2] The problem corresponding to Background Art [2] is as follows.

The above-described conventional arrangement provides functions different from the traveling function such as the ability to climb over an uneven road surface with changing the heights of the traveling devices relative to the vehicle body by the link mechanism, the ability of self returning by means of the manipulator when the vehicle falls sideways, etc. Thus, such arrangement can be applied to an agricultural work vehicle that carries out a work while traveling in a field having much unevenness.

Notwithstanding the above, in the case of contemplating application of the above arrangement to an agricultural work vehicle, when such a different operation as lifting and conveying an object such as a harvested produce, in addition to the traveling devices is to be carried out, it is further necessary to provide object-conveying work devices such as a manipulator, a utility implement, etc. Whereby, there is a disadvantage of the arrangement becoming complicated.

In view of the above, it is desired to provide a work vehicle that has a simple arrangement, yet can convey an object.

Solution to the Problem

[1] Solution corresponding to the problem [1] is as follows.

A work vehicle comprising:
a vehicle body;
a plurality of traveling devices for driving traveling;
a plurality of articulated link mechanisms having at least two or more joints and supporting the plurality of traveling devices to the vehicle body, with allowing the plurality of traveling devices to be elevated/lowered independently of each other;
a driving mechanism capable of changing respective postures of the plurality of articulated link mechanisms independently of each other; and
a plurality of turning mechanisms configured to support the respective plurality of the articulated link mechanisms to the vehicle body, with allowing the link mechanisms to be orientation-changeable about a vertical axis.

With the above-described arrangement, by changing the heights of the plurality of traveling devices relative to the vehicle body along road surface unevenness by extending/contracting the articulated link mechanisms, it is made possible to travel to climb over even a road surface having much unevenness.

And, by changing the orientation of each articulated link mechanism about the vertical axis, the left/right orientation of the traveling device relative to the vehicle body can be changed. When making a turn to the left or the right, by changing the orientation of the traveling device to the direction of the turning, it is possible to provide travel driving (driving traveling) without applying any sideways excessive force to the traveling devices.

Moreover, when the vehicle body is elevated to a high position relative to the ground contacting faces of the traveling devices by extending/contacting the articulated link mechanisms, the traveling devices will be turned from the front/rear orientations to the sideways orientations, so that there is secured a wide left/right ground contacting width for realizing stable support.

Therefore, it has become possible to arrange such that a turn can be made smoothly without applying any excessive force to the traveling devices while allowing traveling to climb over significantly uneven road surface and stable support can be provided even when the vehicle body is elevated to a high position.

According to one preferred embodiment:

the articulated link mechanism includes a base end portion supported to the vehicle body, a first link having one end portion thereof pivotally connected to the base end portion to be pivotable about a horizontal axis, and a second link having one end portion thereof pivotally connected to the other end portion of the first link to be pivotable about a horizontal axis and having the other end portion thereof supporting the traveling device; and the turning mechanism is supported to a frame of the vehicle body, and includes a vehicle side support member that supports the base end portion pivotally about a vertical axis.

With the above-described arrangement, by changing the pivotal posture of the first link relative to the vehicle body and changing the pivotal posture of the second link relative to the first link, the height of the traveling device relative to the vehicle body is changed.

And, the base end portion to which one end portion of the first link is connected is supported to be pivotable about the vertical axis by the vehicle side support member supported to the frame of the vehicle body. As the second link is pivotally connected to the first link and the traveling device is supported to the second link, the base end portion, the first link, the second link and the traveling device supported to the second link are supported respectively and altogether to the vehicle body to be pivotable about the vertical axis.

To whichever position the traveling device is pivoted about the vertical axis, each of the base end portion, the first link, the second link and the traveling device always maintains a same posture. Therefore, an operation for changing the height of the traveling device through posture change of the articulated link mechanism is possible, to whichever positions they may be pivoted about the vertical axis Further, regardless of the posture assumed by the articulated link mechanism, the traveling device can make a turn about the vertical axis.

According to one preferred embodiment:

the driving mechanism includes a first hydraulic cylinder capable of changing the pivotal posture of the first link relative to the vehicle body, and a second hydraulic cylinder capable of changing the pivotal posture of the second link relative to the first link; and the turning mechanism a hydraulic cylinder for a turning operation for changing the orientation of the articulated link mechanism about the vertical axis relative to the vehicle side support member.

With the above-described arrangement, the turning mechanism and the articulated link mechanism respectively has its posture changed by a hydraulic cylinder. A hydraulic cylinder generally has water resistance and dust resistance. Thus, even when water or dust adheres its surface, entrance thereof to the inside can be prevented, so that possibility of e.g. its malfunction due to the adverse influence therefrom is low. Accordingly, even in a work environment where there is the possibility of intrusion of fine dust or water, the posture changing operation can be carried out in a favorable manner.

According to one preferred embodiment:

an idle wheel (free-rotation wheel) is supported to a connecting portion between the first link and the second link; and the traveling device and the idle wheel are changeable in their orientations together about the vertical axis.

With the above-described arrangement, the vehicle body can be supported on the ground surface by the traveling device and the idle wheel, with a wide ground contacting width in the front/rear direction. Further, as the idle wheel is supported to the connecting portion between the first link and the second link, even when the pivotal connecting portion between the first link and the second link approaches the ground surface in association with an elevating/lowering operation of the traveling device, smooth guide will be provided as the idle wheel comes into contact with the ground surface. Moreover, as a support shaft for the pivotal connection between the first link and the second link can be used also as a pivot shaft of the idle wheel, in comparison with an arrangement of providing a dedicated support shaft for supporting the idle wheel, the support of the idle wheel can be realized by a simple arrangement.

According to one preferred embodiment:

the articulated link mechanism is disposed to be located on more lateral outer side than a lateral outer end portion of the vehicle body; and as seen in a plan view, the turning mechanism is disposed to be located between the vehicle body and the articulated link mechanism.

With the above-described arrangement, the traveling device supported by the articulated link mechanism is disposed on more lateral outer side than the lateral outer end portion of the vehicle body, thus being supported in a stable manner with a wide ground contacting spacing in the lateral direction. And, since the turning mechanism is disposed to be located between the vehicle body and the articulated link mechanism as seen in the plan view, with a turning operation, the traveling devices can be set under postures further widened to the lateral outer sides, whereby further stabilization of the ground contacting posture can be realized.

According to one preferred embodiment:

the turning mechanism is provided in a state of being located more upwards than the articulated link mechanism as seen in a side view.

the turning mechanism is provided in a state of being located more upwards than the articulated link mechanism as seen in a side view.

With the above-described arrangement, since the turning mechanism is provided at a position more upwardly of the articulated link mechanism, at the time of traveling on a road surface with much unevenness, the risk of the turning mechanism coming into contact with a protrusion to be damaged thereof is less. Further, for instance, in case the turning mechanism is provided at the same height as the wheel or the idle wheel, a joint, a link mechanism etc. will be needed additionally for constantly maintaining the turning shaft perpendicularly to the ground surface, thus leading to disadvantage of the arrangement becoming complicated. On the other hand, with the above-described arrangement, the turning is possible with the simple arrangement, without increasing such joint or link mechanism.

[2] Solution corresponding to the problem [2] is as follows.

A work vehicle comprising:

a vehicle body;

a plurality of traveling functional portions provided one pair on the left and the right at respective front/rear opposed side portions of the vehicle body, the traveling functional portions being drivable for traveling;

a vehicle body support portion for supporting the traveling functional portions respectively with allowing changes in height positions thereof relative to the vehicle body and allowing also maintaining of the posture of the vehicle body; and a driving operational portion operable to change the vehicle support portion;

wherein the traveling functional portions and the vehicle body support portion are supported to the vehicle body to be turnable about a vertical axis; and wherein one pair of the traveling functional portions are turned closer to each other to clamp an object therebetween.

With the above-described arrangement, the plurality of traveling functional portions are supported to the vehicle body by the vehicle body support portion to be changeable in their height positions relative to the vehicle body; and the traveling functional portions and the vehicle body support portion are supported to the vehicle body to be turnable about a vertical axis.

And, the traveling functional portions are provided one pair on the left and the right at respective front/rear opposed side portions of the vehicle body, and as one pair of the traveling functional portions are turned closer to each other, an object can be clamped therebetween. Namely, the one pair of traveling functional portions serve as a means for clamping and conveying an object. On the other hand, the vehicle body can be moved with using the other traveling functional portions. As a result, since an object is conveyed by using a plurality of traveling functional portions provided for the vehicle body to travel, no special work device or the like for object conveying is needed, and a simple arrangement can suffice to serve for that purpose.

Therefore, it has become possible to provide a work vehicle that has a simple arrangement, yet can convey an object.

According to one preferred embodiment:

when either one of the traveling functional portions on the left and right opposed sides, which are located on the vehicle front side, and the traveling functional portions on the left and right sides, which are located on the vehicle rear side, are placed in contact with the ground surface for maintaining the posture of the vehicle body, the other thereof are floated off the ground surface and are turned closer to each other to clamp the object therebetween.

With the above-described arrangement, either one of the traveling functional portions on the left and right opposed sides which are located on the vehicle body front side (to be referred to as "the front side one se" hereinafter), and the traveling functional portions on the left and right opposed sides which are located on the vehicle body rear side (to be referred to as "rear side one set" hereinafter) are placed in contact with the ground surface for maintaining the posture of the vehicle body, and the other thereof are afloat off the ground surface to be turned to closer to each other, thus clamping an object therebetween.

Namely, one of the front portion side one set and the rear portion side one set serves as "leg(s)" for supporting the vehicle body and the other of the front portion side one set and the rear portion side one set serves as a means for conveying the object. In this way, an object can be conveyed by four traveling functional portions alone, thus being coped with by a simple arrangement.

According to one preferred embodiment:

the plurality of traveling functional portions respectively includes a wheel for travel driving and an idle wheel corresponding to the wheel;

the traveling functional portion is arranged such that, as the wheel and the idle wheel both come into contact with the ground surface, the vehicle body is supported with a front/rear width extending between the wheel and the idle wheel; and the vehicle body support portion comprises a bending link mechanism, the bending link mechanism including a first link having one end portion thereof supported to the vehicle body to be pivotable about a horizontal axis, and a second link having one end portion thereof supported to the other end portion of the first link to be pivotable about a horizontal axis;

the wheel is supported to the other end portion of the second link; and the idle wheel is supported to a connecting portion between the first link and the second link.

With the above-described arrangement, the vehicle body can be supported on the ground surface with a wide ground contacting width wide in the front/rear direction by the wheel and the idle wheel. And, by changing the pivotal posture of the first link relative to the vehicle body and changing the pivotal posture of the second link relative to the first link, the traveling functional portion can be elevated/lowered relative to the vehicle body. As a result, when the vehicle body is supported by the traveling functional portions on the left and right sides located on ether the front portion side or the rear portion side, as the wheels and the idle wheels of the pair of left and right traveling functional portions come into contact with the ground surface, an object can be conveyed under a stable posture with the wide ground contacting width. Moreover, as the idle wheel is supported to the pivotal connecting portion between the first link and the second link, even when the pivotal connecting portion between the first link and the second link comes closer to the ground surface in association with an elevation/lowering operation of the traveling functional portions, the object can be guided smoothly as the idle wheels are placed in contact with the ground surface. Further, as the support shaft for the pivotal connection between the first link and the second link is used also as the pivot shaft for the idle wheel, in comparison with an arrangement of providing a support shaft dedicated for the supporting of the idle wheel, the supporting arrangement can be formed simple.

According one preferred embodiment:

the work vehicle further comprises a plurality of turning mechanisms configured to support the respective plurality of vehicle body support portions to the vehicle body to be turnable about a vertical axis.

With this arrangement, regardless of the posture assumed by the vehicle body support portions, namely, regardless of the height positions of the traveling functional portions relative to the vehicle body, the vehicle body supporting portions and the traveling functional portions can be turned together with maintaining the posture.

According to one preferred embodiment:

the driving operational portion includes a first hydraulic cylinder capable of changing the pivotal posture of the first link relative to the vehicle body, and a second hydraulic cylinder capable of changing the pivotal posture of the second link relative to the first link; and the turning mechanism includes a hydraulic cylinder for a turning operation for changing the orientation of the bending link mechanism about the vertical axis.

With the above-described arrangement, the bending link mechanism has its posture changed by two hydraulic cylinders, and the turning mechanism has its posture changed by the turning operation hydraulic cylinder. A hydraulic cylinder generally has water resistance and dust resistance. Thus, even when water or dust adheres its surface, entrance thereof to the inside can be prevented, so that possibility of e.g. its malfunction due to the adverse influence therefrom is low. Accordingly, even in a work environment where there is the possibility of intrusion of fine dust or water, the posture changing operation can be carried out in a favorable manner.

[3] Further and other features and advantageous effects achieved thereby will become apparent upon reading the following explanation with reference to the accompanying drawings.

BRIEF DESCRIPTION OF THE DRAWINGS

FIG. 7 is a plan view showing a left turning state provided by a turning mechanism,
FIG. 8 is a plan view showing a right turning state provided by the turning mechanism.

EMBODIMENTS FOR CARRYING OUT THE INVENTION

Next, embodiments of a work vehicle relating to the present invention will be described with reference to the accompanying drawings.

Figure 1:
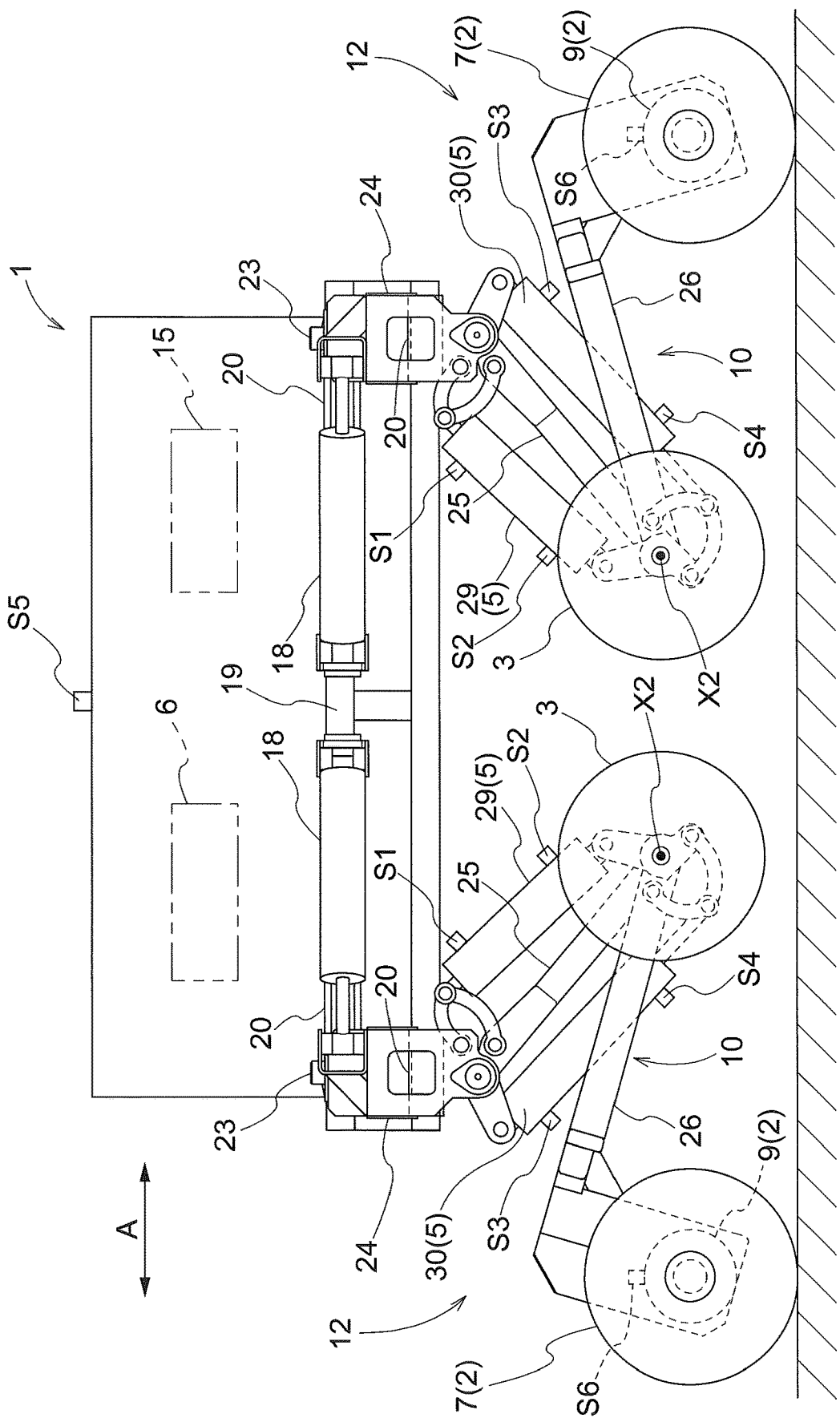
FIG. 1 is an overall side view of a work vehicle.
Figure 2:
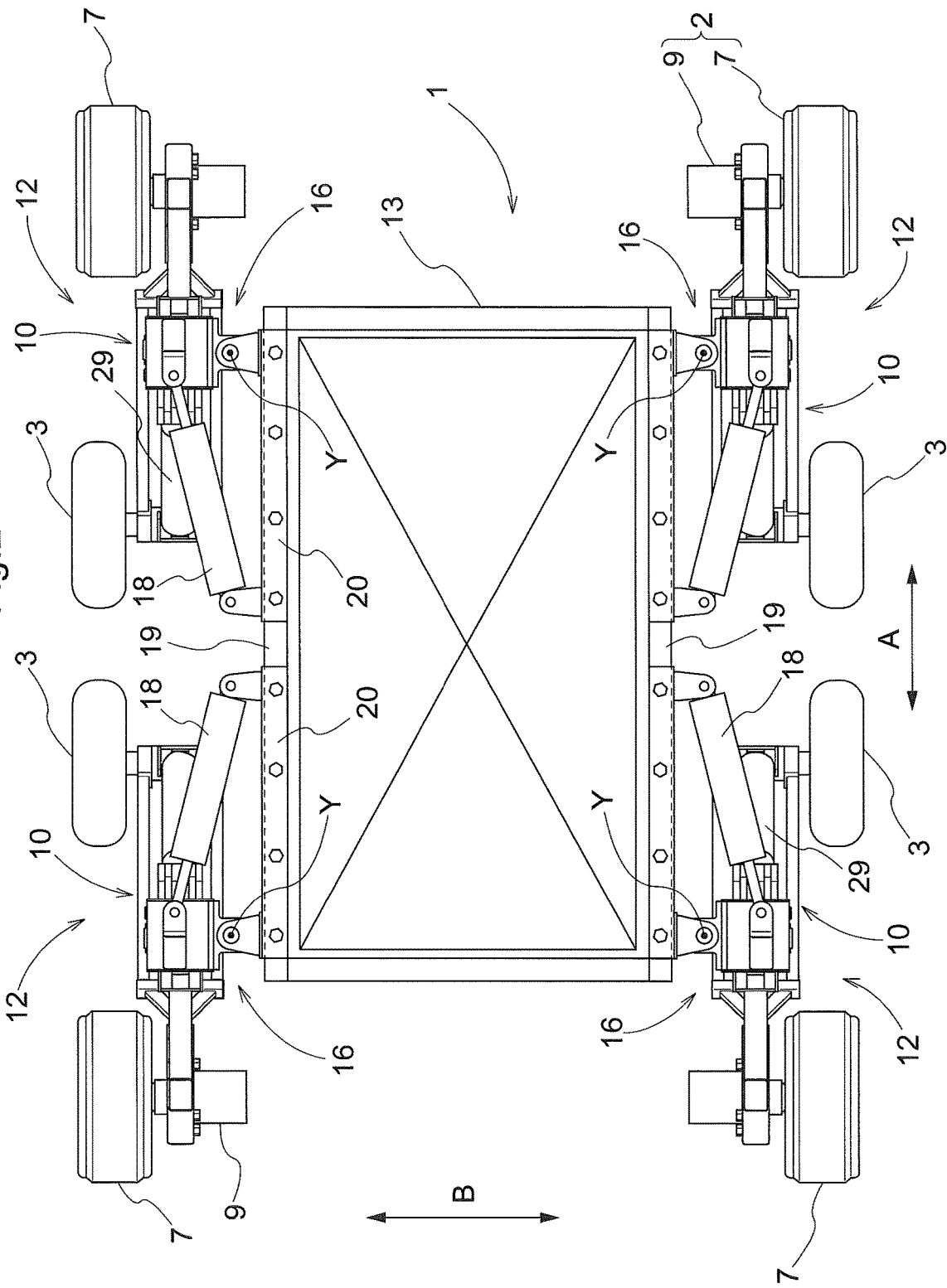
FIG. 2 is an overall plan view of the work vehicle.

As shown in FIGS. 1 and 2, a work vehicle includes a vehicle body 1 substantially in the form of a rectangular-shaped frame for supporting the entire vehicle, a plurality (specifically four sets) of traveling devices 2, a plurality of idle wheels 3 provided in correspondence with the plurality of traveling devices 2, a plurality of bending link mechanisms 10 (an example of an articulated link mechanism, an example of a body support portion), a plurality of hydraulic drive type driving mechanisms 5 serving as driving operational portions capable of variably operating the bending link mechanisms 10, and a plurality of working oil supply devices 6 for supplying working oil to the driving mechanisms 5 (an example of driving operational portion).

Each one of the plurality of traveling devices 2 includes a wheel 7 supported to be rotatable about a horizontal axis and a hydraulic motor 9 mounted within a shaft support portion 8 of the wheel 7. In operation, each traveling device 2 is capable of rotatably driving each corresponding wheel 7 by activating the hydraulic motor 9.

In the instant embodiment, in defining a front/rear direction of the vehicle body, this direction is defined along the traveling direction of the vehicle body. In defining a left/right direction of the vehicle body, this direction is defined as seen along the vehicle body traveling (advancing) direction. Namely, the direction denoted with mark (A) in FIG. 1 is the vehicle body front/rear direction, and the direction denoted with mark (B) in FIG. 2 is the vehicle body left/right direction.

The driving mechanism 5 is capable of changing the posture of each of the plurality of bending link mechanisms 10 independently. The idle wheel 3 is freely rotatably supported to an intermediate bending portion 1 (see FIG. 4) of each of the plurality of bending link mechanisms 10. And, one traveling device 2 and one idle wheel 3 corresponding to this traveling device 2 together constitute one set of "traveling functional portion 12". And, the one set of traveling functional portion 12 is supported to be changeable in its posture by one bending link mechanism 10. Hence, total of four sets of traveling functional portions 12 are mounted on the front and rear opposed sides of the vehicle body 1, one pair each on the left and right sides. Therefore, the bending link mechanism 10, the traveling device 2 and the idle wheel 3 respectively are provided one pair on the left and right sides on the front and rear opposed sides of the vehicle body 1.

The vehicle body 1 includes a rectangular-shaped frame 13 configured to surround the entire circumference of the vehicle body 1 and to support this vehicle body 1 entirely. The working oil supply device 6 is supported as being accommodated in the inside of the vehicle body 1. Though not detailed therein, the working oil supply device 6 includes a hydraulic pump driven by an engine mounted on the vehicle for delivering working oil to the driving mechanism 5, a plurality of hydraulic control valves for controlling the working oil delivered from the hydraulic pump to the driving mechanism 5, a working oil tank, etc. and caries out feeding/discharging of the working oil to/from the driving mechanism 5 or adjustment of its flow rate.

Inside the vehicle body 1, there is mounted a control device 15 for controlling operations of the working oil supply devices 6. Though these control operations by the control device 15 will not be detailed herein, based on control information inputted via an unillustrated manual input device or control information set and stored in advance, the feeding states of the working oil to the driving mechanisms 5 and the hydraulic motors 9 are controlled.

Next, a supporting arrangement for supporting the traveling devices 2 to the vehicle body 1 will be described.

The plurality (specifically four sets) traveling devices 2 are supported to be elevated/lowered independently relative to the vehicle body 1 via the bending link mechanisms 10. Each bending mechanism 10 is supported to the vehicle body to be changeable in its orientation about a vertical axis by a turning mechanism 16.

More particularly, the bending link mechanism 10 is supported to the support frame 13 to be pivotable about a vertical axis Y via the turning mechanism 16. The turning mechanism 16 includes a vehicle body side support portion 17 (see FIG. 3 and FIG. 4) which is connected to the support frame 13 and pivotally supports the bending link mechanism 10, and a turning operation hydraulic cylinder 18 (to be referred to as a "turning cylinder 18" hereinafter) for turning the bending link mechanism 10.

More particularly, as shown in FIGS. 3, 4, 5 and 6, the vehicle body side support portion 17 includes connecting members 20 engageable with a pair of upper and lower angular cylindrical front/rear oriented frame bodies 17 provided at lateral side portions of the support frame 13 for clamping these frame bodies 17 from the lateral outer side and detachably bolt-connected to each other, an outer side pivot bracket 21 disposed at an outer side portion in the vehicle body front/rear direction of the connecting members 20, an inner side pivot bracket 22 disposed at an inner side portion in the vehicle body front/rear direction of the connecting members 20, and a vertically oriented pivot support shaft 23 supported to the outer side pivot bracket 21, whereby the vehicle body side support portion 17 supports the bending link mechanism 10 with allowing its pivotal movement about the axis Y of the pivot support shaft 23.

The bending link mechanism 10 includes a base end portion 24 supported to the vehicle body side support portion 17 with its vertically position fixed and being pivotable about the vertical axis Y, a first link 25 having one end portion thereof supported to a lower portion of the base end portion 24 to be pivotable about a horizontal axis X1, and a second link 26 having one end portion thereof supported to the other end portion of the first link 25 to be pivotable about a horizontal axis X2 and having the other end portion thereof supported to the traveling device 2.

More particularly, the base end portion 24 is provided in the form of a rectangular-shaped frame, and at a position offset to the vehicle body lateral width inner side, the base end portion 24 is supported to the outer side pivot bracket 21 of the vehicle body side support portion 17 to be pivotable about the vertical axis Y via the pivot support shaft 23. The turning cylinder 18 has its one end portion pivotally connected to the inner side pivot bracket 22 and has its outer end portion pivotally connected at a laterally offset position to the pivot support shaft 23 of the base end portion 24.

Across the left and right opposed end portions of the base end portion 24, a support shaft 27 provided on one end side of the first link 25 is pivotally supported, and the first link 25 is connected to a lower portion of the base end portion 24 to be pivotable about the axis of the support shaft 27.

Figure 4:
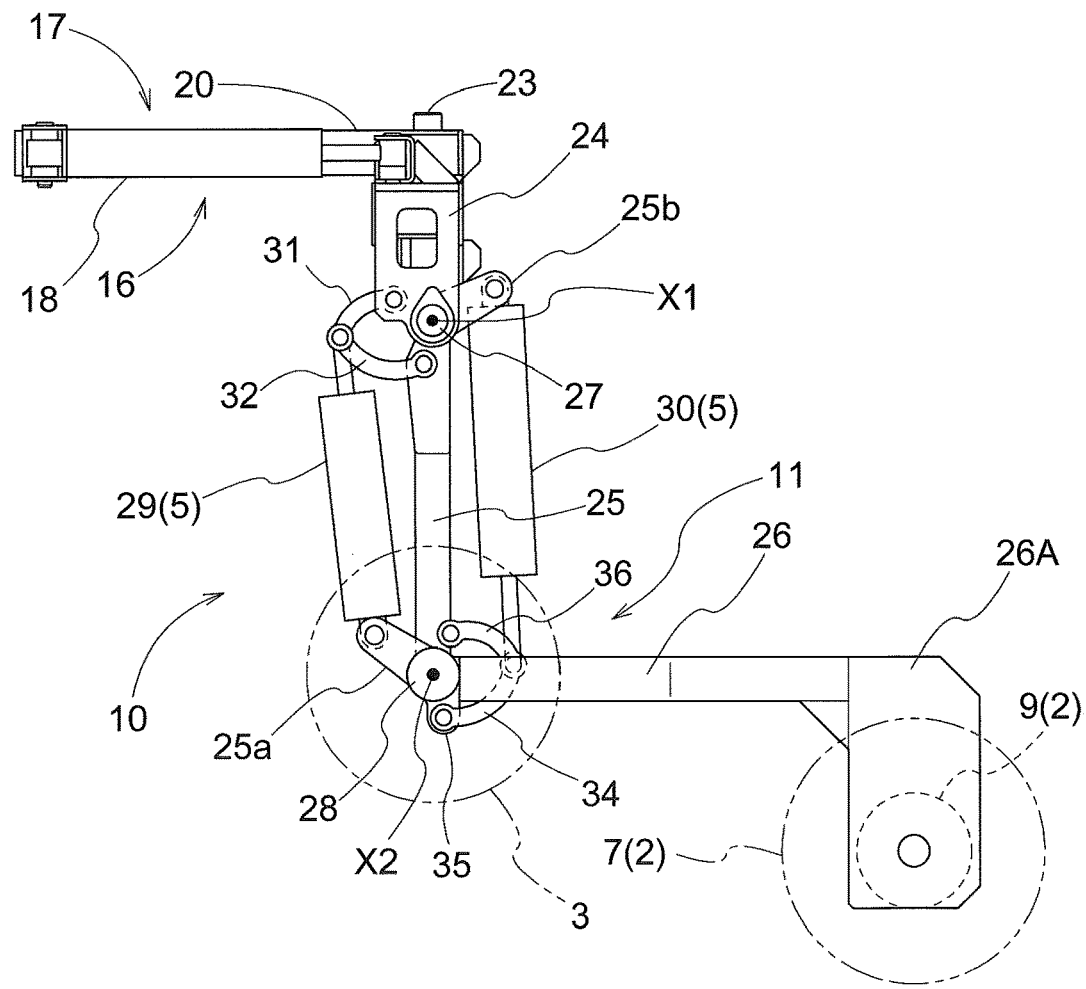
FIG. 4 is a side view of the bending link mechanism.
Figure 5:
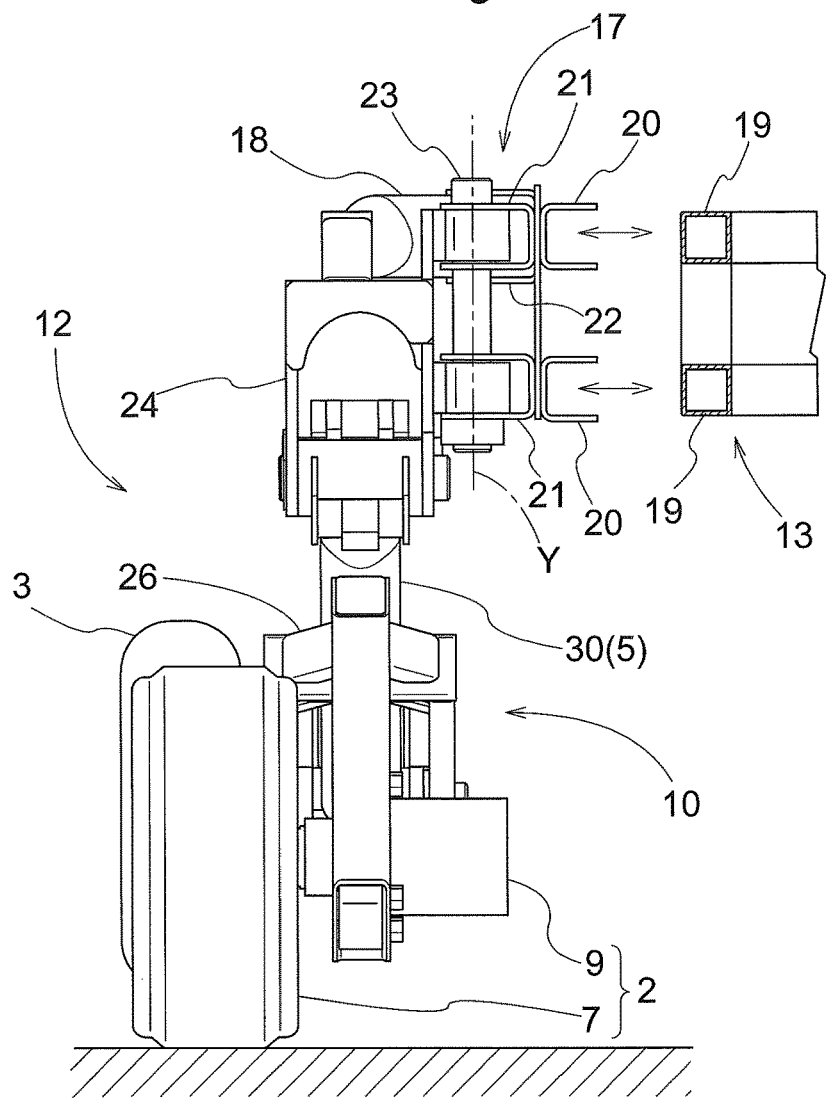
FIG. 5 is a front view showing the bending link mechanism under its dismounted state.
Figure 6:
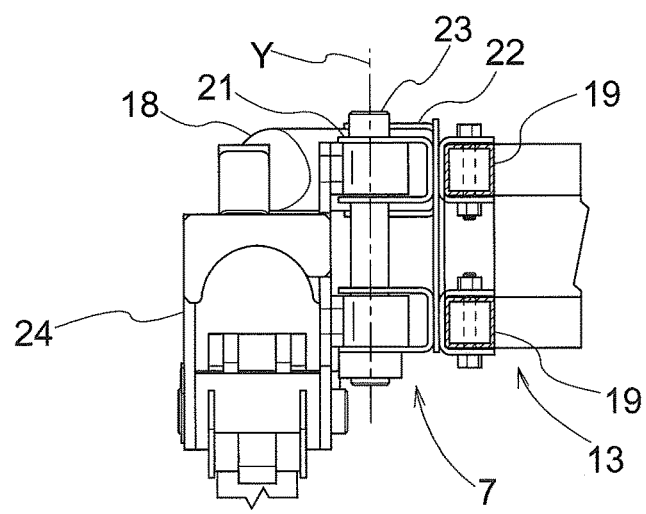
FIG. 6 is a front view showing the bending link mechanism under its mounted state.

As shown in FIG. 4, the first link 25 includes a base end side arm portion 25b and an other end side arm portion 25a. At one end side portion of the first link 25, there is integrally formed the base end side arm portion 25b extending obliquely upper outwards. At the other end side portion of the first link 25, there is integrally formed the other end side arm portion 25a extending obliquely upper outwards.

Figure 3:
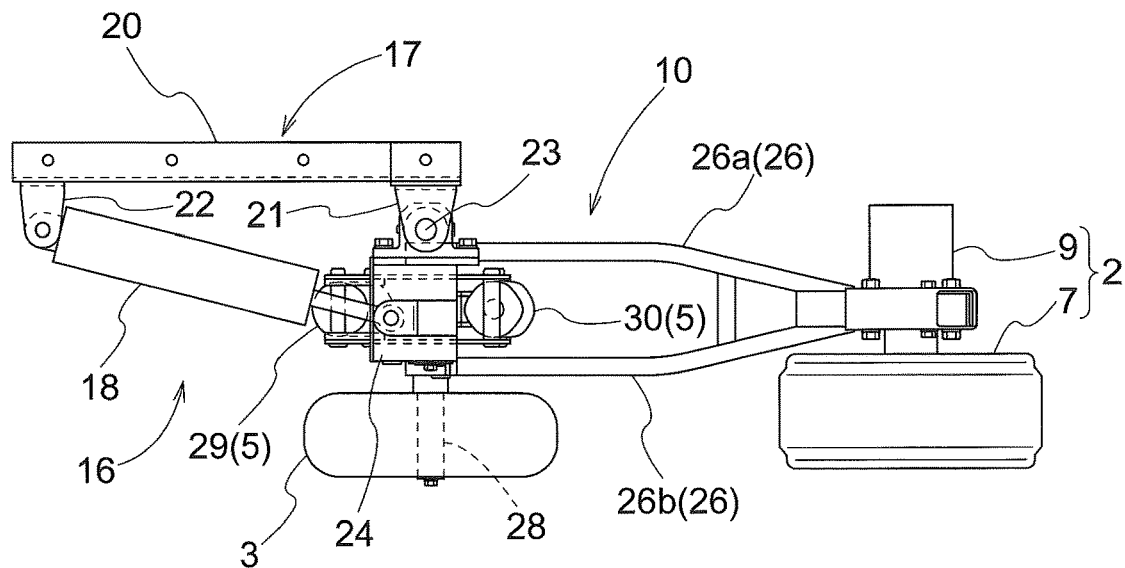
FIG. 3 is a plan view of a bending link mechanism.

As shown in FIG. 3, the second link 26 is formed bifurcated as seen in the plan view, with a pair of left and right band-plate like plate bodies 26a, 26b. The connecting portion of the second link 26 to the first link 25 is separated with a spacing provided by the pair of plate bodies 26a, 26b. In the area bound between the pair of plate bodies 26a, 26b, a connecting support shaft 28 to be connected to the first link 25 is pivotally supported. At the pivotal side end portion opposite to the connecting portion of the second link 26 to the first link 25, the traveling device 2 is supported. As shown in FIG. 4, the pivotal movement side end portion of the second link 26, there is formed an L-shaped extension portion 26A which extends in an approximately L-shape in the direction away from the vehicle body 1 and at the extension side end portion of this L-shaped extension portion 26A, the traveling device 2 is supported.

For each one of the plurality (four sets) of bending link mechanisms 10, the driving mechanism 5 is provided. As shown in FIG. 1 and FIG. 4, the driving mechanism 5 includes a first hydraulic cylinder 29 capable of changing the pivotal posture of the first link 25 relative to the vehicle body 1 and a second hydraulic cylinder 30 capable of changing the pivotal posture of the second link 26 relative to the first link 25. The first hydraulic cylinder 29 and the second hydraulic cylinder 30 are disposed in concentration in the vicinity of the first link 25.

As seen in a plan view, the first link 25, the first hydraulic cylinder 29 and the second hydraulic cylinder 30 are arranged between the pair of plate bodies 26a, 26b of the second link 26. As shown in FIG. 3 and FIG. 4, the first hydraulic cylinder 29 is located on the vehicle body front/rear direction inner side relative to the first link 25 to extend along the longitudinal direction of the first link 25. One end portion of the first hydraulic cylinder 29 is operably connected to a lower portion of the base end portion 24 via an arc-shaped first coupling member 31. The one end portion of the first hydraulic cylinder 29 is operably connected to a base end side portion of the first cylinder 25 via another second coupling member 32. The first coupling member 31 and the second coupling member 32 respectively have opposed end portions thereof pivotally connected to be pivotable relative to each other. The other end portion of the first hydraulic cylinder 29 is operably connected to the other end side arm portion 25a formed integral with the first link 25.

The second hydraulic cylinder 30 is disposed on the opposite side to the first hydraulic cylinder 29, namely, on the vehicle body front/rear direction outer side relative to the first link 25 and substantially extends along the longitudinal direction of the first link 25. One end portion of the second hydraulic cylinder 30 is operably connected to the base end side arm portion 25b formed integral on the base end side of the first link 25. The other end portion of the second hydraulic cylinder 30 is operably connected to the arm portion 35 formed integral at the base end side portion of the second link 26 via a third coupling member 34. The other end portion of the second hydraulic cylinder 30 is operably connected also to the pivotal movement end side portion of the first link 25 via another fourth coupling member 36. The third coupling member 34 and the fourth coupling member 36 respectively have opposed end portions thereof pivotally connected to be pivotable relative to each other.

When the first hydraulic cylinder 29 is extended or contracted with an operation of the second hydraulic cylinder 30 being stopped, the first link 25, the second link 26 and the traveling device 2 will respectively pivot together while maintaining the relative postures thereof, about the horizontal axis X1 where they are connected to the base end portion 24. When the second hydraulic cylinder 30 is extended or contracted with an operation of the first hydraulic cylinder 29 being stopped, the second link 26 and the traveling device 2 will pivot, with maintaining the posture of the first link 25 constant, together about the horizontal axis X2 at the connecting portion between the first link 25 and the second link 26.

At the intermediate bending portion 11 of each one of the plurality (four sets) of bending link mechanisms 10, the idle wheel 3 is supported. As shown in FIG. 1 and FIG. 2, the idle wheel 3 is configured as a wheel having an approximately same outside diameter as the wheel 7 of the traveling device 2. As shown in FIG. 3, the connecting support shaft 28 which pivotally connects the first link 25 to the second link 26 is formed to extend to protrude on more vehicle body lateral width direction outer side than the second link 26. And, at the extending protruding portion of the connecting support shaft 28, the idle wheel 3 is supported to be freely rotatable.

Namely, the connecting support shaft 28 which pivotally connects the first link 25 to the second link 26 functions also as a pivot support shaft of the idle wheel 3, thus simplification of the arrangement through co-use of a component being sought for.

As shown in FIG. 3, the turning cylinder 18 has one end portion pivotally connected to the inner side pivot bracket 22 and has the other end portion pivotally connected to a position of the base end portion 24 offset laterally relative to the pivot support shaft 23.

As shown in FIG. 7 and FIG. 8, the bending link mechanism 10, the traveling device 2, the idle wheel 3 and the driving mechanism 5 respectively are supported altogether to the outer side pivot bracket 21 to be pivotable about the axis Y of the pivot shaft support 23. And, by extending/contracting the turning cylinder 18, the above members will be pivoted altogether. With this, it is possible to effect a turning operation from a straight traveling state in which the traveling device 2 is oriented along the front/rear direction to a left turning direction or a right turning direction by about 45 degrees, respectively.

When the bolt connection of the coupling member 20 to a front/rear oriented frame body 19 is released, the turning mechanism 16, the bending link mechanism 10, the traveling device 2, the idle wheel 3 and the driving mechanism 5, as being integrally assembled to each other, can now be detached from the vehicle body 1. Conversely, when the coupling member 20 is bolt-connected to the front/rear oriented frame body 19, the above-cited respective devices/components, as being assembled integrally to each other, can now be attached to the vehicle body 1.

Form the working oil supply device 6, working oil is supplied respectively to the first hydraulic cylinder 29 and the second hydraulic cylinder 30 of each one of the plurality of bending link mechanism 10. Feeding and discharging of the working oil are effected by the hydraulic control valve, so that the first hydraulic cylinder 29 and the second hydraulic cylinder 30 can be extended/contracted. This hydraulic control valve is controlled by the control device 15.

Also, as flow rate of the working oil is controlled by the hydraulic control valve corresponding to the hydraulic motor 9, the rotational speed of the hydraulic motor 9, namely, of the wheel 7 can be changed. The hydraulic control valve is controlled by the control device 15 based on e.g. control information inputted by a manual operation or preset and stored control information, etc.

As shown in FIG. 1, this work vehicle includes various kinds of sensors. Specifically, the work vehicle includes a first cap-side pressure sensor S1 and a first head-side (counter-cap side) pressure sensor S2 which are provided in the first hydraulic cylinder 29, and a second cap-side pressure sensor S3 and a second head-side (counter-cap side) pressure sensor S4 which are provided in the second hydraulic cylinder 30. The firster cap-side pressure sensor S1 detects an oil pressure of a cap-side chamber of the first hydraulic cylinder 29. The first head-side pressure sensor S2 detects an oil pressure of a head-side chamber of the first hydraulic cylinder 29. The second cap-side pressure sensor S3 detects an oil pressure of a cap-side chamber of the second hydraulic cylinder 30. The second head-side pressure sensor S4 detects an oil pressure of a head-side chamber of the second hydraulic cylinder 30. Further, though not shown, the above-described hydraulic cylinders 18, 29, 30 respectively incorporates a stroke sensor capable of detecting an extension/contraction stroke amount, thus feeding back an operational state to the control device 15.

Incidentally, the attaching positions of the respective pressure sensors S1, S2, S3, S4 are not limited to the positions described above. It suffices for the respective pressure sensors S1, S2, S3, S4 to be capable of detecting (estimating) an oil pressure in the cap-side chamber or the head-side chamber, and so these sensors may be disposed within pipes extending from the valve mechanism to the cap-side chamber or the head-side chamber corresponding thereto.

Based on the detection results of these sensors, forces needed for supporting the vehicle body 1 will be calculated. Then, based on the calculation results, supplies of the working oil to the respective first cylinder 29 and the respective second cylinder 30 will be controlled. Specifically, based on the detection value of the first cap-side pressure sensor S1 and the detection value of the first head-side pressure sensor S2, a pressure difference between the cap-side chamber and the head-side chamber of the first hydraulic cylinder 29 is obtained and from this pressure difference, a cylinder propelling force for the first hydraulic cylinder 29 will be calculated. Similarly, based on the detection value of the second cap-side pressure sensor S3 and the detection value of the second head-side pressure sensor S4, a pressure difference between the cap-side chamber and the head-side chamber of the second hydraulic cylinder 30 is obtained and from this pressure difference, a cylinder propelling force for the second hydraulic cylinder 30 will be calculated, similarly for the first hydraulic cylinder 29.

The vehicle body 1 mounts an acceleration sensor S5 which can be comprised of e.g. a three-axis acceleration sensor. Based on a detection result of this acceleration sensor S5, a front/rear, left/right tilt of the vehicle body 1 is detected and based on the result of this detection, the posture of the vehicle body 1 is controlled. Namely, supplies of the working oil to the respective first hydraulic cylinder 29 and the respective second hydraulic cylinder 30 will be controlled such that the posture of the vehicle body 1 may become a target posture.

The traveling device 2 includes a rotation sensor S6 for detecting a rotational speed of the wheel 7. Based on a rotational speed of the wheel 7 calculated by the rotation sensor S6, the supply of the working oil to the hydraulic motor 9 is controlled so that the rotational speed of the wheel 7 may become a target speed.

As described above, the work vehicle of this embodiment is configured such that the traveling device 2 is supported via the bending link mechanism 10 and also that the posture of the bending link mechanism 10 is changed by the hydraulic cylinders 29, 30 as the hydraulic drive type driving mechanism 5 and moreover that the traveling drive is carried out by means of a hydraulic motor. Therefore, the work vehicle is suitable for an agricultural work as being affected little by water or fine dust, etc.

As exemplary uses of the work vehicle having such configurations, there are modes of traveling as follows.

<Mode of Traveling on Flat Ground Surface>

Figure 9:
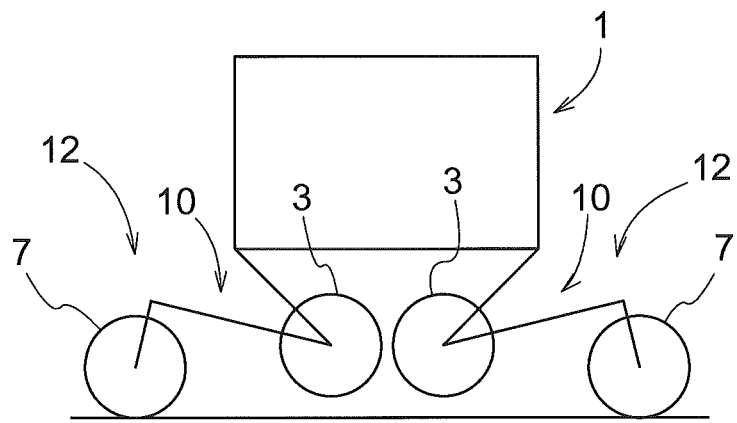
FIG. 9 is an explanatory view of a four-wheel traveling state.
Figure 10:
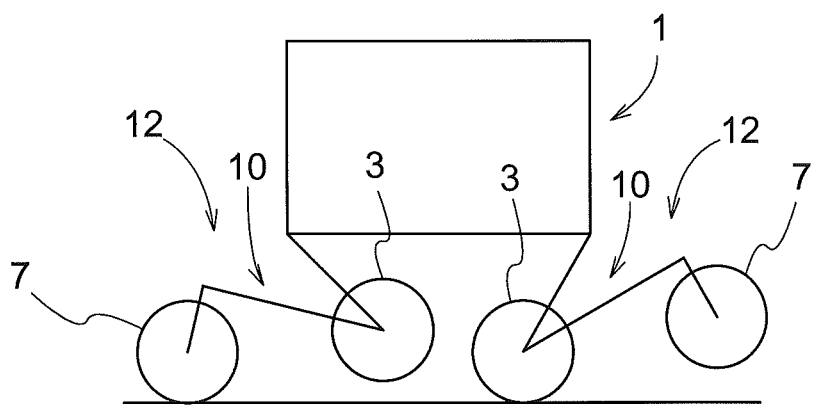
FIG. 10 is an explanatory view of a two-wheel traveling state.
Figure 11:
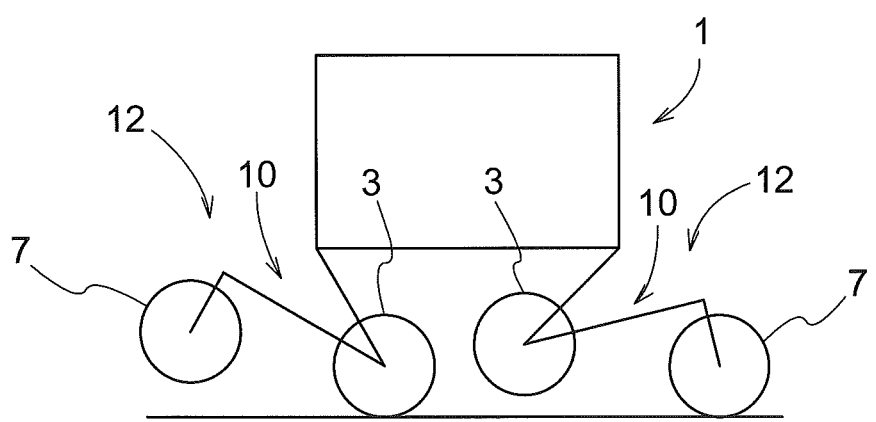
FIG. 11 is an explanatory view of the two-wheel traveling state.

In the case of traveling on a flat ground surface, the traveling is possible in any one of different kinds of traveling modes. Namely, as shown in FIG. 9, the traveling mode can be a four-wheel traveling mode in which all of the four traveling devices 2 (specifically the wheels 7) are placed in contact with the ground surface and also all of the four idle wheels 3 are set afloat the ground surface. Alternatively, as shown in FIG. 10, the traveling mode can be a two-wheel traveling mode in which the traveling device 2 (wheel 7) located on one side in the vehicle body front/rear direction is placed in contact with the ground surface and the idle wheel 3 corresponding to this traveling device 2 (wheel 7) is set afloat the ground surface and also the traveling device 2 (wheel 7) located on the other side in the vehicle body front/rear direction is set afloat the ground surface and the idle wheel 3 corresponding to that traveling device 2 (wheel 7) is placed on contact with the ground surface.

The two wheel traveling state can be also a state in which the relationship between the traveling device 2 (wheel 7) and the idle wheel 3 is reversed in the vehicle body front/rear direction. That is, as shown in FIG. 1, it can be a state in which the traveling device 2 (wheel 7) located on one side in the vehicle body front/rear direction is placed in contact with the ground surface and the idle wheel 3 corresponding to this traveling device 2 (wheel 7) is set afloat the ground surface and also the traveling device 2 (wheel 7) located on the other side in the vehicle body front/rear direction is set afloat the ground surface and the idle wheel 3 corresponding to this traveling device 2 is placed in contact with the ground surface.

More particularly, the bending link mechanism 10 can be configured in each one of the four sets of traveling functional portions 12 to be switchable between a traveling state in which the traveling device 2 (wheel 7) is placed in contact with the ground surface and the idle wheel 3 corresponding thereto is set afloat the ground surface; and a free moving state in which the idle wheel 3 is placed in contact with the ground surface and the traveling device 2 (wheel 7) corresponding thereto is set afloat the ground surface.

In the four wheel traveling state described above, all of the four sets of traveling functional portions 12 are set to the traveling state. In the two wheel traveling state described above, two sets of traveling functional portions 12 on one side in the vehicle body front/rear direction are set to the traveling state and two sets of the traveling functional portions 12 on the opposite side are set to the free traveling state.

Further, in addition to the four wheel traveling state and the two wheel traveling state described above, it is also possible to switch to a "partial traveling state" in which three traveling functional portions 12 of the total four traveling functional portions 12 are set to the traveling state and the other remaining one traveling functional portion 12 is set to the free moving state. With this setting, it is possible to keep three traveling functional portions 12 in contact with the ground surface in a stable manner and to e.g. extend one traveling functional portion 12 to an upper side of a step, etc. at the same time. In addition to the above, it is also possible to switch three traveling functional portions 12 of the total four traveling functional portions 12 to the free moving state and to set the remaining one traveling functional portion 12 to the traveling state.

In short, the driving mechanism 5 can be switched over between an "all traveling state" in which all of the four traveling functional portions 12 are set to the traveling state and the "partial traveling state" in which at least one of the fourth traveling functional portions 12 is set to the traveling state and the remaining others are set to the free moving state.

Figure 12:
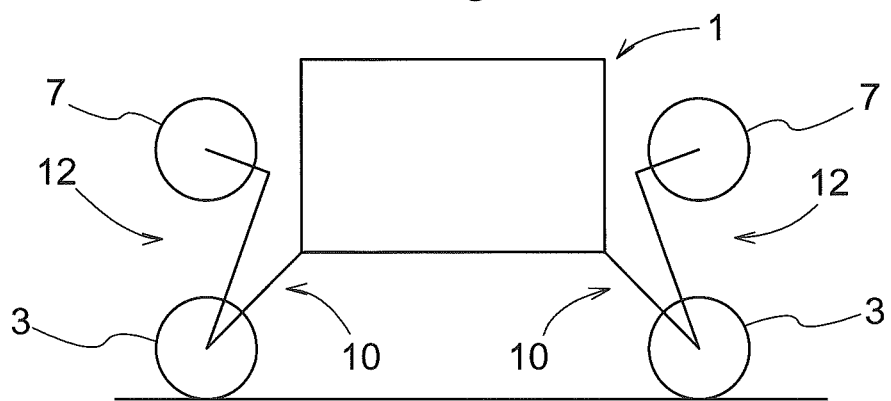
FIG. 12 is a side view of a free moving state.

In addition to the traveling modes described above, as shown in FIG. 12, it is also possible to set and use all of the four sets of traveling functional portions 12 to the free moving state. In this case, driving traveling is not possible, but it is possible to easily move the vehicle by pushing it hands.

With this work vehicle, in addition to the above-described traveling on a flat ground surface, the work vehicle can be used in following modes as "special" uses thereof.

<Two-Leg Erection Mode>

It is possible to place the traveling device 2 at a high place by greatly tilting the vehicle body 1.

Figure 13:
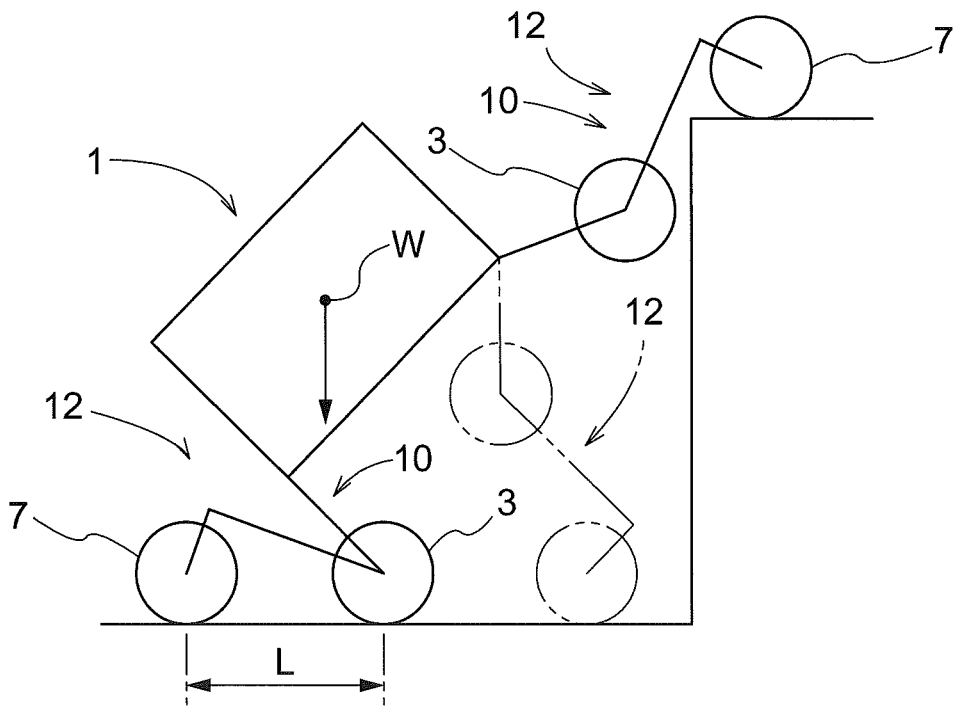
FIG. 13 is a side view of step riding-over state.

Namely, as shown in FIG. 13, when all of the traveling devices 2 and the idle wheels 3 of the two sets of traveling functional portions 12 on one side in the vehicle body front/rear direction are placed in contact with the ground surface, the vehicle body 1 is greatly tilted to raise the other side thereof with using the bending link mechanisms 10 which support the two sets of traveling functional portions 12 on the other side in the vehicle body front/rear direction. And, when the vehicle body becomes tilted until a gravity center position W of the vehicle body 1 is located within a ground contacting width L defined by the two sets of traveling function portions 12 on the other side, the bending link mechanisms 10 supporting the two sets of traveling functional portions 12 on the other side can be extended largely to place the traveling devices 2 onto a ground surface which is located at a high place.

Figure 14:
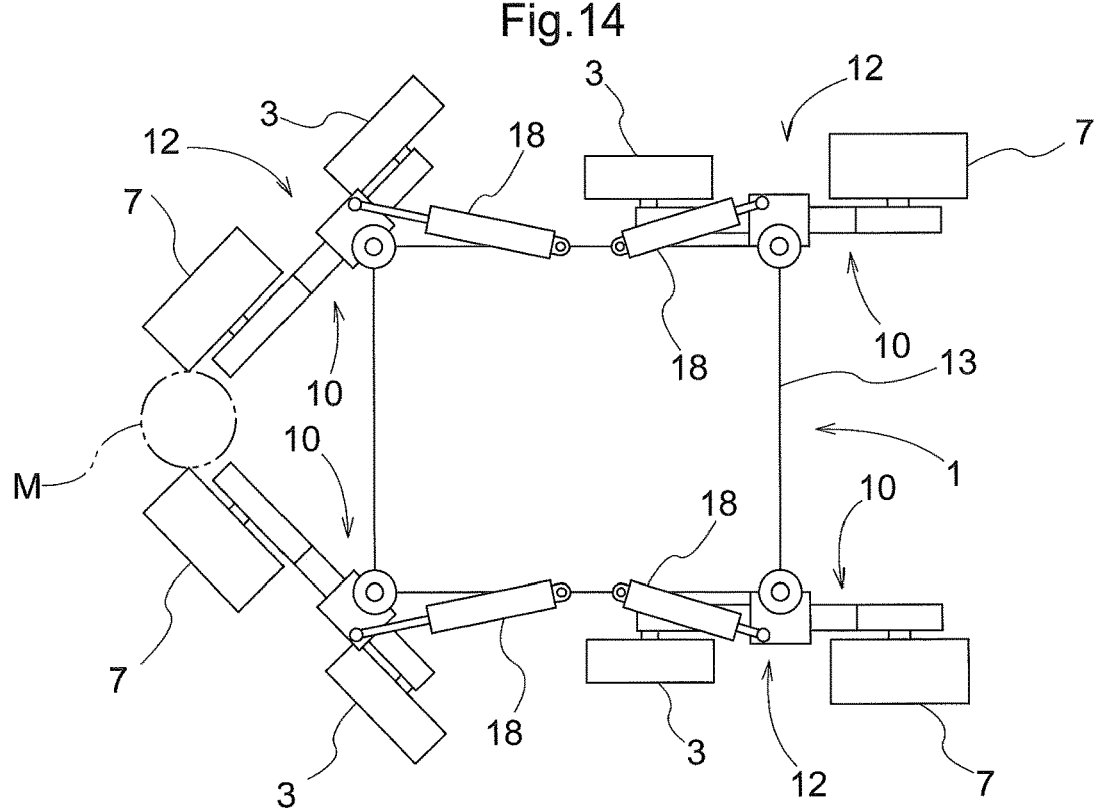
FIG. 14 is a plan view of an object conveying state.
Figure 15:
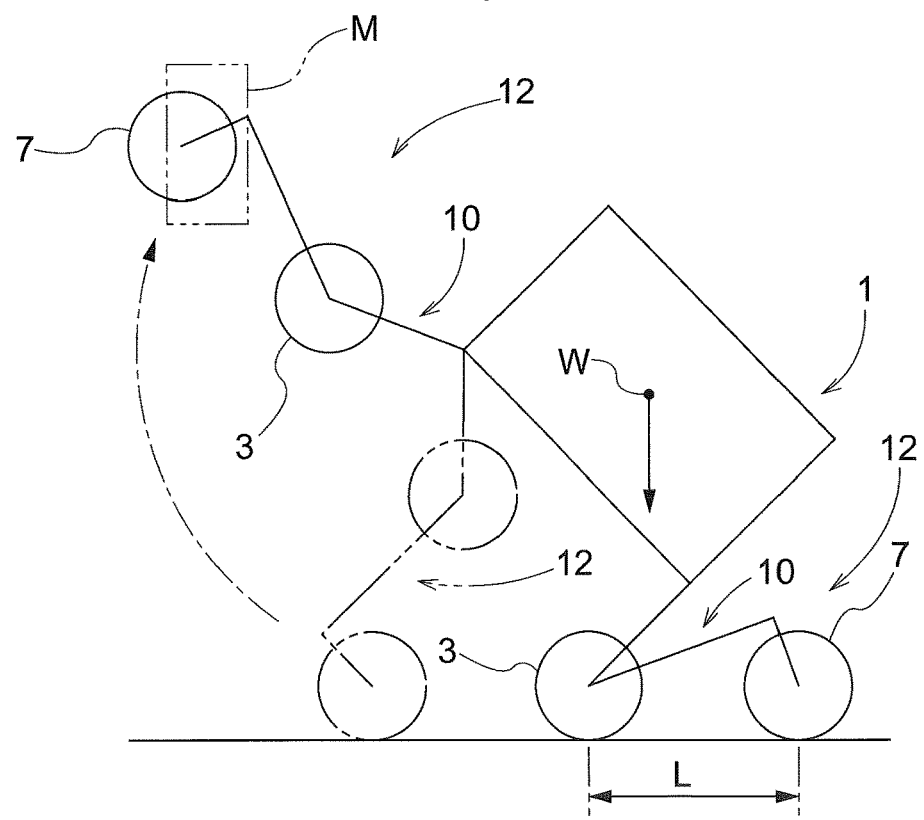
FIG. 15 is a side view of the object conveying state.

In this two leg erect state, in addition to the mode of riding over to a high place, as shown in FIG. 14 and FIG. 15, it is also possible to carry out a movement for hoisting an object. Namely, as described above, the vehicle body 1 will be greatly tilted with keeping the traveling devices 2 and the idle wheels 3 of the two sets of traveling functional portions 12 on one side in the vehicle body front/rear direction in contact with the ground surface, until the gravity center position W of the vehicle body 1 is located within the ground contacting width L defined by the two sets of traveling functional portions 12 on one side. Further, in the two sets of traveling functional portions 12 on the other side in the vehicle body front/rear direction, turning operations are carried out so as to bring the traveling functional portions 12 on the left and right opposed sides closer to each other. By the traveling devices 2 of the two sets of traveling functional portions 12 on the other side in the vehicle body front/rear direction, an object M as a conveying subject will be clamped and then hoisted. With the object M being clamped, it is possible to travel and move with keeping the posture of the vehicle body by the two sets of traveling functional portions 12 on one side in the vehicle body front/rear direction, so that the object M can be conveyed.

<Slope Face Traveling Mode>

Figure 16:
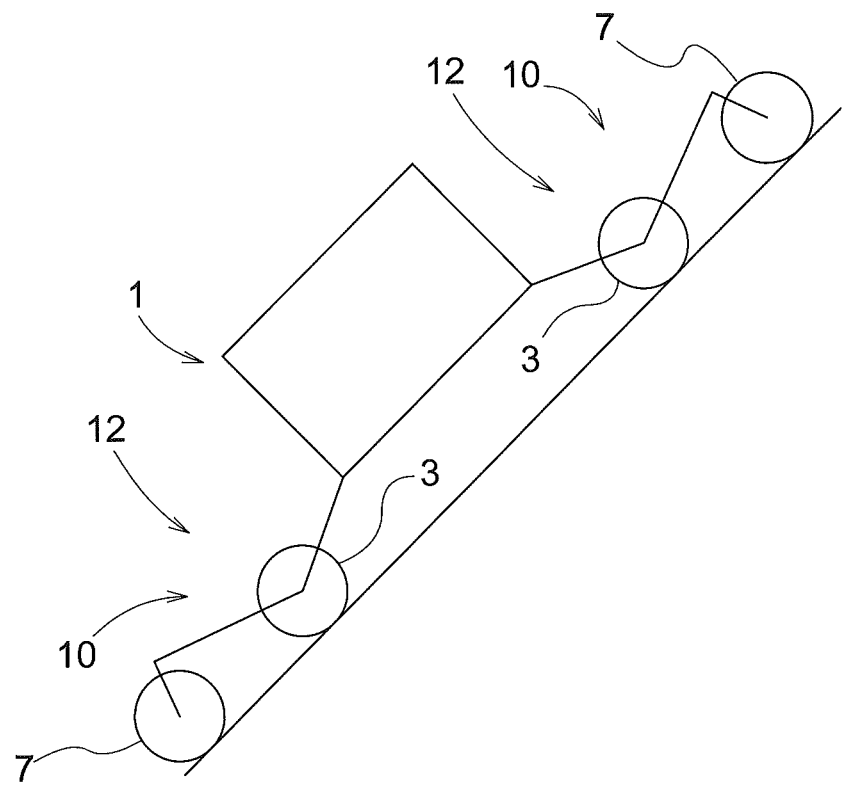
FIG. 16 is a side view of a slope face traveling state.

As shown in FIG. 16, in all of the four sets of traveling functional portions 12, the postures of the bending link mechanisms 10 will be switched to the extended postures in which the traveling devices 2 and the idle wheels 3 are respectively located on more vehicle body front/rear direction outer side than the vehicle body front/rear direction outer end portions. With all of the traveling devices 2 and the idle wheels 3 being placed in contact with the ground surface, the first links 25 and the second links 26 will be brought as close as possible to the horizontal posture, thereby to lower the height of the vehicle body 1 to a low position. Under this condition, the vehicle will travel while climbing up a slope face. In this traveling mode, the ground contacting width along the vehicle body front/rear direction is increased, so that even on a sloped face having a significant inclination, the vehicle can travel in a stable manner without toppling.

<Step Riding-Over Mode>

All of the traveling devices 2 and the idle wheels 3 of three sets of traveling functional portions 12 of the total four sets of traveling functional portions 12 will be placed in contact with the ground surface, so as to support the vehicle body 1 on the ground surface in a stable manner. Under this condition, the bending link mechanism 10 supporting the remaining one traveling function portion 12 will be extended largely to allow each traveling device 2 to ride onto an upper face of a step, so that the vehicle can ride over the step, as shown in FIG. 13 for instance. While the bending link mechanism 10 of each set of traveling functional portions 12 is extended, each set of traveling functional portions 12 will be moved to ride onto the upper face of a higher step, thereby to ride over the step. FIG. 13 illustrates a case of the high step, but the vehicle body 1 can ride over a step if it is low.

<Stride-Over Traveling State>

Figure 17:
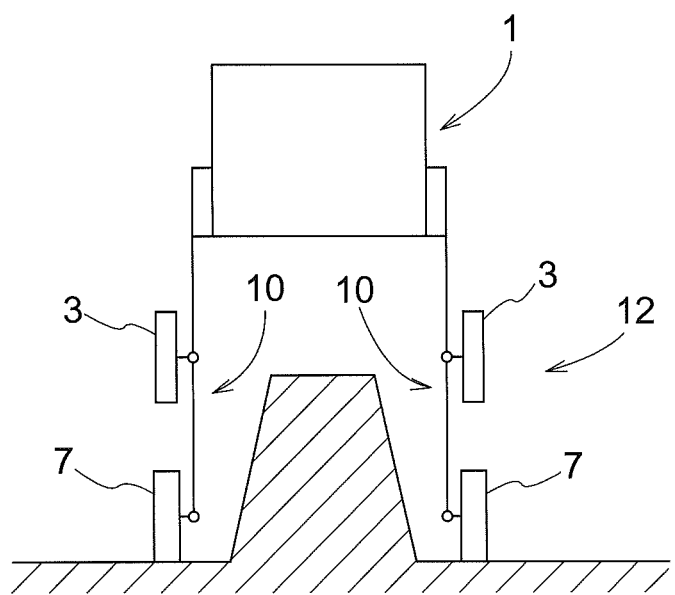
FIG. 17 is a front view of a stride-over traveling state.

As shown in FIG. 17, in all of the four sets of the traveling functional portions 12, the bending link mechanisms 10 will be extended largely, so as to elevate the vehicle body 1 far above the ground surface. For instance, a utility work can be carried out with keeping the vehicle body 1 striding across above a ridge. Hence, even when an agricultural produce planted on the ridge has grown, it is still possible to carry out a chemical agent spraying, a harvesting work from above the produce.

Incidentally, though not described in details, in the case of traveling in the various modes such as those described above, the control device 15 will control operations of the respective hydraulic cylinders 18, 29, 30 and the respective hydraulic motors 9, in a mode corresponding to instructed contents, based on the control information inputted by a manual operation or preset and stored control information, etc.

OTHER EMBODIMENTS (1) In the foregoing embodiment, the driving mechanism 5 includes the first hydraulic cylinder 29 and the second hydraulic cylinder 30. In place of this arrangement, it is also possible to arrange such that a hydraulic motor is provided at a pivot support portion of the bending link mechanism 10 so that the posture of the bending link mechanism 10 is changed by this hydraulic motor.

(2) In the foregoing embodiment, the traveling device 2 is driven by the hydraulic motor 9. In place of this arrangement, it is also possible to arrange e.g. such that power of an engine mounted on the vehicle is fed to the wheels 7 via some mechanical transmission mechanism such as a chain transmission mechanism, etc.

(3) In the foregoing embodiment, the traveling device 2 includes one wheel 7. In place of this arrangement, the traveling device 2 may comprise a crawler traveling device having a crawler belt wound around a plurality of wheels.

(4) In the foregoing embodiment, the traveling devices 2 are provided one pair on the left and right on the front and rear opposed sides of the vehicle body 1. Instead, the traveling devices 2 may be provided three sets, or further alternatively the traveling devices 2 may be provided five or more sets.

(5) In the foregoing embodiment, as seen in a plan view, the turning mechanism 16 is disposed between the vehicle body 1 and the bending link mechanism 10 and also this turning mechanism 16, as seen in a side view, is disposed more upwards than the bending link mechanism 10. In place of this arrangement, the turning mechanism 16 may be overlapped with the vehicle body 1 as seen in the plan view, or further alternatively may be overlapped with the bending link mechanism 10, or, even more alternatively, as seen in the side view, may be provided as the same position as the bending link mechanism 10. Thus, it is possible to embody with varying the disposing positions of the turning mechanism 16 in many ways.

(6) In the foregoing embodiment, for changing the posture of the bending link mechanism 10, as the driving operational portion, the first hydraulic cylinder 29 and the second hydraulic cylinder 30 are provided. In place of this arrangement, at the pivotal support portion of the bending link mechanism 10, a hydraulic motor may be provided, so that the posture of the bending link mechanism 10 may be changed by this hydraulic motor.

(7) In the foregoing embodiment, the bending link mechanism 10 is provided as the "vehicle body support portion". In place of this arrangement, as such "vehicle body support portion", e.g. a robot arm which can be bent in a desired direction, etc. may be employed for supporting the traveling functional portion 12. In short, any arrangement may be employed which supports the respective traveling functional portion 12 to the vehicle body 1 with allowing change of its height position independently and that supports the vehicle body with maintaining its posture. Various modifications are possible in the specific arrangement.

(8) In the foregoing embodiment, the turning mechanism 16 is provided with the turning operation hydraulic cylinder 18 capable of turning the bending link mechanism 10 entirely. Instead, this turning operation may be effected by an electric motor or a hydraulic motor.

(9) In the foregoing embodiment, as an example of the work vehicle, an electronically controlled robot was cited. However, the present invention is not limited to the arrangements shown in the drawings.

DESCRIPTION OF REFERENCE NUMERALS/MARKS

1: vehicle body
2: traveling device
3: idle wheel
5: driving mechanism (driving operational portion)
7: wheel
10: bending link mechanism (articulated link mechanism, vehicle body support portion)
12: traveling functional portion
17: vehicle side support portion
18: turning cylinder (hydraulic cylinder for turning operation)
24: link side pivot member
25: first link
26: second link
29: first hydraulic cylinder
30: second hydraulic cylinder
X1, X2: horizontal axis
Y: vertical axis

What is claimed is:

1. A work vehicle comprising:
  a vehicle body;
  a plurality of traveling devices for driving traveling;
  a plurality of articulated link mechanisms having at least two or more joints and supporting the plurality of traveling devices to the vehicle body while allowing the plurality of traveling devices to be elevated and lowered independently of each other;
  a driving mechanism capable of changing respective postures of the plurality of articulated link mechanisms independently of each other; and
  a plurality of turning mechanisms configured to support the respective plurality of the articulated link mechanisms to the vehicle body, while allowing the link mechanisms to be orientation-changeable about a vertical axis, wherein the turning mechanisms each include:
- a vehicle side support member detachably supported by a frame of the vehicle body; and
- a hydraulic cylinder for a turning operation, the hydraulic cylinder connected to a base end portion of the articulated link mechanism, for changing the orientation of the articulated link mechanism about a vertical axis, and
- the base end portion of the articulated link mechanism is supported to the vehicle side support member to be pivotable about the vertical axis, and an end portion of the hydraulic cylinder that is on an opposite side to an end portion of the hydraulic cylinder connected to the base end portion is directly connected to the vehicle side support member.

2. The work vehicle as defined in claim 1, wherein:
the articulated link mechanisms each include a base end portion supported to the vehicle body, a first link having one end portion thereof pivotally connected to the base end portion to be pivotable about a horizontal axis, and a second link having one end portion thereof pivotally connected to the other end portion of the first link to be pivotable about a horizontal axis and having the other end portion thereof supporting the traveling device.

3. The work vehicle as defined in claim 2, wherein:
the driving mechanism includes a first hydraulic cylinder capable of changing the pivotal posture of the first link relative to the vehicle body, and a second hydraulic cylinder capable of changing the pivotal posture of the second link relative to the first link.

4. The work vehicle as defined in claim 2, wherein:
an idle wheel is supported to a connecting portion between the first link and the second link; and
the traveling device and the idle wheel are changeable in their orientations together about the vertical axis.

5. The work vehicle as defined in claim 1, wherein:
the articulated link mechanisms each are disposed to be located on a more lateral outer side than a lateral outer end portion of the vehicle body; and
as seen in a plan view, the turning mechanisms each are disposed to be located between the vehicle body and the respective articulated link mechanism.

6. The work vehicle as defined in claim 1, wherein:
the turning mechanisms each are provided in a state of being located more upwards than the articulated link mechanism as seen in a side view.

7. A work vehicle comprising:
a vehicle body;
a plurality of traveling functional portions provided on a left and a right side, at both a front and a rear portion of the vehicle body, the traveling functional portions being drivable for traveling;
a vehicle body support portion for supporting the traveling functional portions respectively while allowing changes in height positions thereof relative to the vehicle body and allowing also maintaining of the posture of the vehicle body; and
a driving operational portion operable to change the vehicle support portion;
wherein the traveling functional portions and the vehicle body support portion are supported to the vehicle body to be turnable about a vertical axis;

wherein one pair of the traveling functional portions are turned closer to each other to clamp an object therebetween;
wherein the plurality of traveling functional portions respectively includes a wheel for travel driving and an idle wheel corresponding to the wheel;
the traveling functional portion is arranged such that, as the wheel and the idle wheel both come into contact with the ground surface, the vehicle body is supported with a front/rear width extending between the wheel and the idle wheel;
the vehicle body support portion comprises a bending link mechanism, the bending link mechanism including a first link having one end portion thereof supported to the vehicle body to be pivotable about a horizontal axis, and a second link having one end portion thereof supported to the other end portion of the first link to be pivotable about a horizontal axis;
the wheel is supported to the other end portion of the second link; and
the idle wheel is supported to a connecting portion between the first link and the second link.

8. The work vehicle as defined in claim 7, wherein:
when either one of the traveling functional portions on the left and right opposed sides, which are located on a vehicle front side, and the traveling functional portions on the left and right sides, which are located on a vehicle rear side, are placed in contact with the ground surface for maintaining the posture of the vehicle body, the other thereof are elevated off the ground surface and are turned closer to each other to clamp the object therebetween.

9. The work vehicle as defined in claim 7, further comprising:
a plurality of turning mechanisms configured to support the respective plurality of vehicle body support portions to the vehicle body to be turnable about a vertical axis.

10. The work vehicle as defined in claim 9, wherein:
the driving operational portion includes a first hydraulic cylinder capable of changing the pivotal posture of the first link relative to the vehicle body, and a second hydraulic cylinder capable of changing the pivotal posture of the second link relative to the first link; and
the turning mechanisms each include a hydraulic cylinder for a turning operation for changing the orientation of the bending link mechanism about the vertical axis.

11. A work vehicle comprising:
a vehicle body;
a plurality of traveling devices for driving traveling;
a plurality of articulated link mechanisms having at least two or more joints and supporting the plurality of traveling devices to the vehicle body while allowing the plurality of traveling devices to be elevated and lowered independently of each other;
a driving mechanism capable of changing respective postures of the plurality of articulated link mechanisms independently of each other; and
a plurality of turning mechanisms configured to support the respective plurality of the articulated link mechanisms to the vehicle body while allowing the link mechanisms to be orientation-changeable about a vertical axis, wherein:
the articulated link mechanisms each include a base end portion supported to the vehicle body, a first link having one end portion thereof pivotally connected to the base end portion to be pivotable about a horizontal axis, and a second link having one end portion thereof pivotally connected to the other end portion of the first link to be pivotable about a horizontal axis and having the other end portion thereof supporting the traveling device;

the turning mechanisms are each supported to a frame of the vehicle body, and include a vehicle side support member that supports the base end portion pivotally about a vertical axis;

an idle wheel is supported to a connecting portion between the first link and the second link; and the traveling device and the idle wheel are changeable in their orientations together about the vertical axis.

* * * * *